United States Patent

[11] 3,631,324

| [72] | Inventor | Richard D. Jones<br>14851 Lewis Road, Miami Lakes, Fla. 33012 |
|---|---|---|
| [21] | Appl. No. | 633,062 |
| [22] | Filed | Apr. 24, 1967 |
| [45] | Patented | Dec. 28, 1971<br>The portion of the term of the patent subsequent to Dec. 28, 1987, has been disclaimed. |

[54] PORTABLE DISTRIBUTION PANEL
6 Claims, 7 Drawing Figs.

[52] U.S. Cl. ................................................... 317/99,
200/50 AA
[51] Int. Cl. ....................................................... H05k 7/14
[50] Field of Search .......................................... 200/50.15,
114.3; 317/99, 103, 117, 119

[56] References Cited
UNITED STATES PATENTS

| 3,403,239 | 9/1968 | Schramm et al. | 200/50.15 |
| 2,664,485 | 12/1953 | Caswell | 317/117 X |
| 3,154,358 | 10/1964 | Blasch | 317/99 X |
| 3,168,683 | 2/1965 | Brokaw | 317/119 |
| 3,170,091 | 2/1965 | Hudson | 317/119 |
| 3,207,956 | 9/1965 | Rothweiler et al. | 317/119 |

Primary Examiner—J. R. Scott
Attorney—Ernest H. Schmidt

ABSTRACT: A portable distribution panel having a main input side adapted to be connected to either of two different power sources, a regular line power source or a generator power source, and including a wheeled housing in which a circuit means are disposed for distribution of power to subfeed connectors, said circuit means including switching means for the subfeed lines and main input switching means.

PATENTED DEC 28 1971
3,631,324
SHEET 1 OF 3
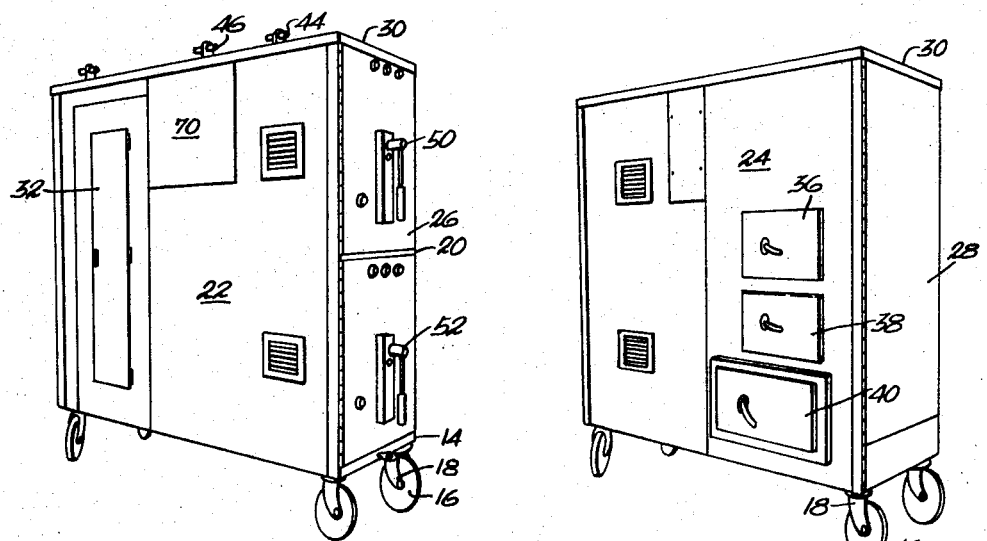
Fig. 1
Fig. 2
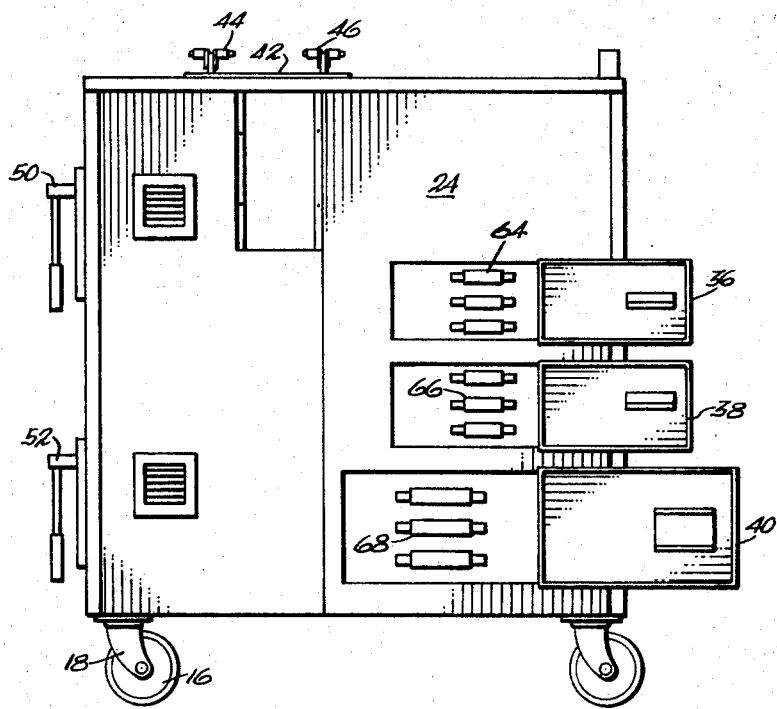
Fig. 3
INVENTOR.
RICHARD D. JONES
BY John Cyril Malloy
ATTORNEY.

INVENTOR.
RICHARD D. JONES
BY John Cyril Malloy
ATTORNEY.

PORTABLE DISTRIBUTION PANEL

In the past, as is well known, there has been a problem of providing temporary emergency power when the distribution panel of large electricity users is inoperable because of damage or which is out of service for repair. The present invention is of a portable power unit adapted to be located intermediate the feed line for such a user and the load side for temporary distribution of the electricity until such time as the distribution panel in chief is back in service and, as a consequence, provides for continual electrical service without material down time.

The portable power distribution panel may be utilized either in homes or commercial or industrial situations. For instance, in an installation of the unit in a home, it will provide temporary distribution while a damaged main service is being replaced or repaired. The same situation applies in utilizing the board for the temporary distribution while a damaged main service is being replaced in a commercial establishment, or for temporarily bypassing a damaged fuse panel or a subfeed while repairs are being made. Also, the unit may be used to bypass a damaged switchboard or other electrical equipment until a repaired or permanent electrical installation is provided. The device finds use in new buildings in that it may be used to distribute lighting and equipment power until the permanent building installation has been installed. As is apparent, the device is highly useful in casualty situations such as hurricane damage, fire damage or lightening damage. Further, as is well known in the art, the replacement or repair of a damaged main breaker or in maintenance programs, it is often necessary to have down time of the permanent distribution panel. The instant invention provides a portable distribution panel which may be used as a part of a maintenance program for periodically checking the various constituent elements of an electrical system including numerous distribution panels so that there will not be a successive down time of each of the units of the system but, rather, a utilization of the portable distribution panel for the particular unit being repaired or checked in the maintenance program.

It will also be apparent that there are numerous situations such as at conventions and during parades where temporary lighting is required. The instant distribution panel may be employed at any suitable location to distribute the power as required.

It is, accordingly, an object of this invention to provide a portable distribution panel for distributing electrical power from a line side to a load side which includes circuit means including a switching system and distributor elements leading to subfeed lines, which portable distribution panel is adapted to be used, for instance, while a permanent portable distribution panel installation is being repaired or is out of service for some other reason.

It is another object of this invention to provide a portable distribution panel which is inexpensive to manufacture and sized for movement into and out of the conventional sized doorways of buildings for use in distributing electrical power from a feed line to a plurality of load lines.

In accordance with these and other objects which will become apparent hereinafter, the instant invention will now be described with reference to the accompanying drawings illustrating a preferred embodiment thereof.

In the drawings:

FIG. 1 is a perspective view of one side and one end of the invention of the portable distribution panel;

FIG. 2 is a perspective view of the opposite sides of the portable distribution panel;

FIG. 3 is a front elevation view of the front side of FIG. 2 and illustrating open access doors;

Figure 4:
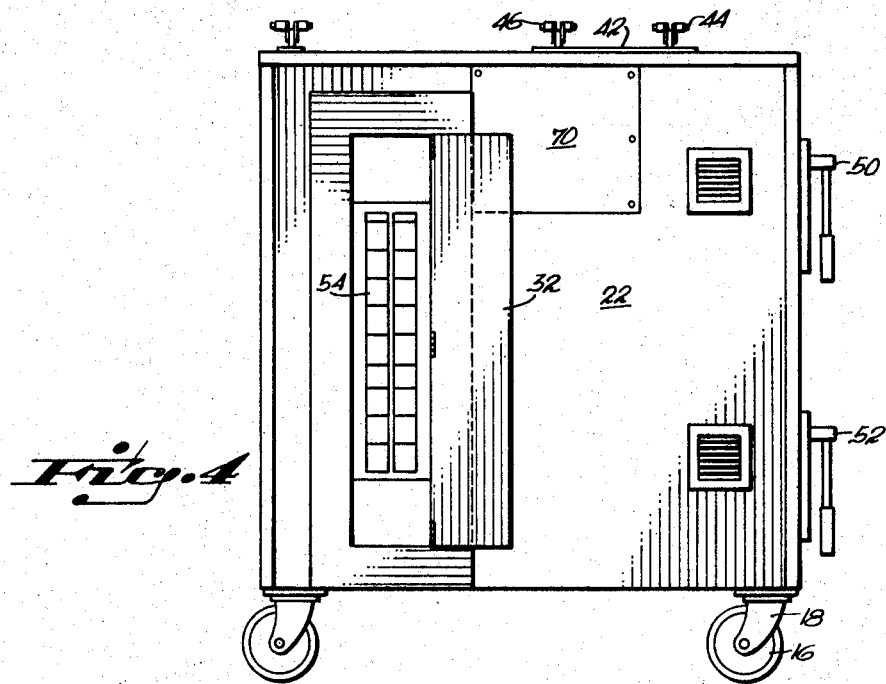
FIG. 4 is an elevation view of the front side of FIG. 1 and illustrating open access doors.
Figure 5:
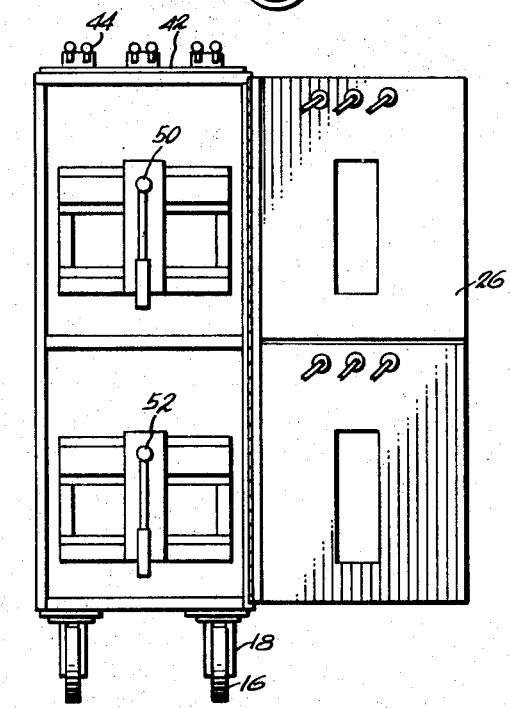
FIG. 5 is a right side elevation view seen in FIG. 1 with the access doors open.
Figure 6:
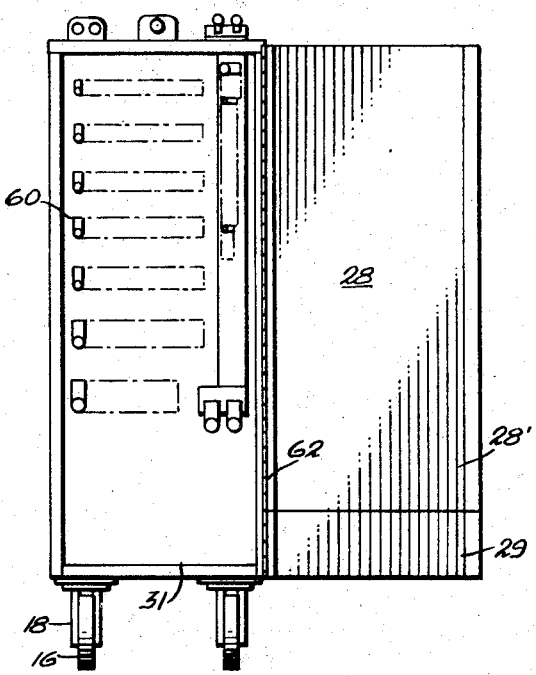
FIG. 6 is a left side elevation view seen in FIG. 2 with the access doors open.
Figure 7:
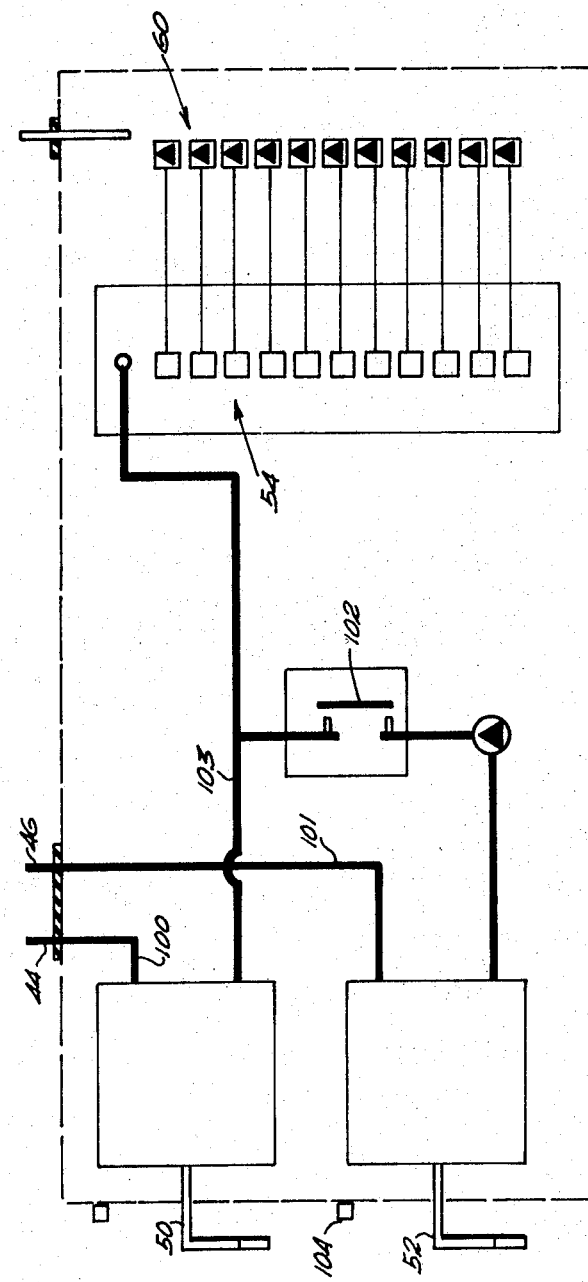
FIG. 7 is a wiring diagram of the portable distribution panel.

Referring to the drawings, wherein like reference characters designate like or corresponding parts throughout the different views, and referring particularly to FIG. 1, there is shown a portable distribution panel which includes a carriage 14 provided with wheels 16 having tires and journaled to the carriage by suitable means such as that indicated at 18. A housing 20 is secured on the carriage, the housing having a main front panel 22, a main rear panel 24, and opposing main end panels 26 and 28, the said panels being spanned by a roof 30. The front panel 22, as seen in FIG. 4, is provided with an access door 32, and the rear panel is provided with a plurality of access doors 36, 38 and 40. The roof 30 of the housing is provided with a stand 42 having connector means 44 and 46 for inlet feed lines. Also, the end side panels 26 and 28 are provided with access doors for the elements of the circuit means 100 including the switches which are to be described hereinafter. The portable distribution panel is preferably sized for passage through a conventional doorway and into a conventional building elevator, the preferred size being in the order of 5 feet high, 6 feet long, and 2 feet wide. In the preferred embodiment, the panel or board is provided with two 2,000-ampere fusible main switches 50 and 52 which may be of the manual type as shown or of the air circuit breaker type. Also, the size of the switches may be varied depending upon the particular installation requirements of the panel. Each of the main switches is fed with suitable bus 101, 102 terminating at the top of the board or panel with the connector means 44 and 46 being provided with lugs for quick and easy cable connection. The main switch 50 is designed in the preferred embodiment with four 750 MCM lugs per phase and inside the distribution panel there are bus stubs with companionate lugs per phase designed for a power takeoff. It will be apparent that these lugs may be easily changed for different installation requirements. In addition, by using an outside temporary switch protection the main disconnect switch 50 provides double protection. The switch 52 is also provided with suitable lugs per phase for incoming power. The side of the housing designed with the panel 28 and access door 32 contains a bank 54 of circuit breakers in the embodiment shown, the bank including six 30-ampere circuit breakers, six 70-ampere circuit breakers, and six 100-ampere circuit breakers, all of which are prewired to a bank 60 accessible through the door 28 which comprises the main end panel and is connected to the housing by means of the hinges 62. It will be apparent that different size breakers may be employed. The housing also includes a distribution panel portion containing two 200-ampere fusible disconnects 64 and 66 and one 400-ampere fusible disconnect 68 which are also prewired to the bank 60 or other suitable lugs and provided with quick terminal connections for use in distributing power. It will be apparent that in lieu of the fusible disconnects 64, 66 and 68, equivalent circuit breakers may be employed. Suitable switch means are provided in the various circuits of the distribution panel leading to the respective terminal connections. The load side of the main switch 52 is prewired with bus 103 to the line side of all disconnect switches that are mounted to the distribution panel. Also, the load side of all disconnect switches in the housing with the exception of the two main switches 50 and 52 are prewired with bus to a termination board enclosed in the housing with a metal door 70 for access. By inserting a short bus link connection the two main disconnect switches 50 and 52 will feed the line side of all disconnects mounted in the housing independently. When this bus link is utilized, main switch 50 and main switch 52 become transfer switches. Thus, by connecting to an outside power source to the bus of the main switch 50 and by connecting a different source of power, such as that of a generator or alternator, and the voltage of the two sources are the same, and by using a "Kirk Key" interlug system 104 mounted in the housing, the different power sources are prevented from being thrown together. By using this system, when the main switch 50 is energized, switch 52 should be in the "off" position; on the other hand, when the inside generator source is used, the main switch 50 is open, the key removed, and switch 52 is closed so as to provide power from the generator or alternator source. The load side of all the disconnect switches is bussed to the termination bank 60; the bus is passed through an insulated board where lugs are disposed to the bus. The insulated board is located in the housing and is spaced from the bank 60 a distance in the order of 6 inches. The leads when connected with suitable conductors to motors, lighting equipment and the like are connected to the board or panel in any suitable manner, preferably as shown in FIG. 6, with the door 28 comprising an upper portion 28' and a lower portion 29 and with the floor 31 of the carriage being recessed slightly inwardly so that the lead wires connecting to the bank 60 may be passed through the recess bottom 31 and the upper portion of the door 28, that portion designated 28' normally being closed. A ground bus is provided and sufficient lugs are provided for use, the ground bus terminating at the top of the housing with suitable lugs, such as four 500 MCM type, and the lugs are directly bolted to the frame of the portable distribution power panel housing for grounding purposes. Also, a ground lug is provided on the bottom of the housing for stringing open wire through a ground water pipe connection for grounding the unit.

Three-phase lamps are preferably provided for each main breaker to indicate that each separate phase from the source is flowing into the line switch. When all three-phase lights on a single main switch are lighted and the switch is energized, a red flashing light located on the top rear of this unit will indicate that the lugs are energized or are "hot" to give warning. Also, a duplex receptacle is mounted and accessible from the exterior of the housing for use by workmen when power is off in an installation environment, a 20-ampere breaker being provided for safety reasons. It will be apparent that although this unit was described is designed for a three-phase system, a single phase system may be used.

While the instant invention has been shown and described herein in what is conceived to be the most practical and preferred embodiment, it is recognized that departures may be made therefrom within the scope of the invention, which is, therefore, not to be limited to the details disclosed herein but is to be accorded the full scope of the claims so as to embrace any and all equivalent apparatus and articles.

What is claimed is:

1. A portable distribution panel including a portable housing having wheels, first connector means on the housing to connect to a power source, a plurality of subfeed connectors on said housing, and circuit means interconnecting said subfeed connectors with said first connector means to distribute power between said first connector and said subfeed connectors (second means) said circuit means comprising a plurality of switches, one in series with each of said subfeed connectors, said housing being adapted to be moved adjacent a distribution panel in an installation and connected as a substitute for use in distributing power through said panel from said first connector means to said subfeed connectors, and means to ground said panel.

2. A device as set forth in claim 1 wherein said housing includes a carriage, wheels journaled on the carriage, and a plurality of upstanding panel members secured on said carriage and defining a body for said housing, said panel members including access doors, and a roof member spanning the terminal ends of said panels, and circuit means being disposed in said body and said connector means and said subfeed connectors being arranged in said body and each being accessible through one of said access doors.

3. A device as set forth in claim 1 wherein circuit breakers are provided in series with said subfeed connectors to interrupt current flow to said subfeed connectors.

4. A device as set forth in claim 1 wherein said first connector means includes a first connector switch to connect to an outside power source and a second connector switch to connect to a generator or alternator source and switch means to alternatively connect said first connector switch or said second connector switch to said circuit means to supply power through said distribution panel to said subfeed connectors.

5. A device as set forth in claim 1 wherein an insulated board is supported in said housing and said plurality of subfeed connectors are arranged in a bank, said insulated board being adjacent said bank, and conductor means to electrically connect said first connector means to said subfeed connectors, said conductor means being supported at said insulated board.

6. A device as set forth in claim 5 wherein said bank is disposed inwardly of one of said access doors defining an open floored recess between said access door and said bank so that conductor means may be connected to said subfeed connectors and led downwardly through said open floor area of said recess.

* * * * *